US010979920B2

(12) United States Patent
Fu et al.

(10) Patent No.: US 10,979,920 B2
(45) Date of Patent: Apr. 13, 2021

(54) INTEGRATED ACCESS SYSTEM WITH BASEBAND UNIT AND BASE STATION NETWORK MANAGEMENT

(71) Applicant: Huawei Technologies Co., Ltd., Shenzhen (CN)

(72) Inventors: Weixiang Fu, Chengdu (CN); Wangjun Wu, Shanghai (CN); Xingguo Wu, Shanghai (CN); Dan Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/424,802

(22) Filed: May 29, 2019

(65) Prior Publication Data

US 2019/0281478 A1    Sep. 12, 2019

Related U.S. Application Data

(63) Continuation of application No. PCT/CN2016/108047, filed on Nov. 30, 2016.

(51) Int. Cl.
*H04W 88/08*  (2009.01)
*H04W 24/04*  (2009.01)
(Continued)

(52) U.S. Cl.
CPC .......... *H04W 24/04* (2013.01); *H04B 1/0007* (2013.01); *H04W 16/20* (2013.01); *H04W 88/085* (2013.01); *H04W 88/08* (2013.01)

(58) Field of Classification Search
CPC ... H04B 1/0007; H04B 1/3816; H04W 16/20; H04W 24/04; H04W 88/08; H04W 88/085
(Continued)

(56) References Cited

U.S. PATENT DOCUMENTS

2014/0378047 A1    12/2014  Kennard
2015/0245245 A1*   8/2015  Chakrabarti ............ H04W 4/70
                                                        370/338
(Continued)

FOREIGN PATENT DOCUMENTS

CN    103391485 A    11/2013
CN    103686814 A     3/2014
(Continued)

OTHER PUBLICATIONS

"AtomCell9.0 LampSite Solution White Paper," Issue: V1.0, Huawei Technologies Co., Ltd., XP055602650, Jan. 9, 2015, 36 pages.
(Continued)

*Primary Examiner* — Philip Sobutka
(74) *Attorney, Agent, or Firm* — Slater Matsil, LLP

(57) ABSTRACT

An integrated access system, comprising a first baseband unit (BBU), a remote common public radio interface (CPRI) data exchange unit connected to the first BBU by a first CPRI channel, a first radio frequency card (RFC) board on a socket of the first BBU, a repeater network management object function module, and a base station network management subsystem including the repeater network management object function module and connected to the first BBU by using an operation management (OM) channel. The first RFC board includes a digital up- and down-frequency conversion module, a digital combination and division module connected to the digital up- and down-frequency conversion module, and a CPRI compression and decompression module, and the digital combination and division module is connected to the CPRI compression and decompression module. The first BBU includes a CPRI mapping and demapping module connected to the CPRI compression and decompression module.

10 Claims, 11 Drawing Sheets

(51) Int. Cl.
*H04B 1/00* (2006.01)
*H04W 16/20* (2009.01)

(58) Field of Classification Search
USPC .................................. 455/561, 128, 129, 347
See application file for complete search history.

(56) References Cited

U.S. PATENT DOCUMENTS

2016/0301141 A1* 10/2016 Del Castillo .......... H01Q 11/10
2017/0251493 A1*  8/2017 Zhang ................. H04L 27/2626
2018/0287696 A1* 10/2018 Barbieri ............. H04B 7/15507

FOREIGN PATENT DOCUMENTS

| CN | 105763232 A | 7/2016 |
| WO | 2015125079 A1 | 8/2015 |

OTHER PUBLICATIONS

"BBU3900 Description" Version 01, XP055602765, Huawei Technologies Co., Ltd., Jun. 30, 2013, 20 pages.

\* cited by examiner

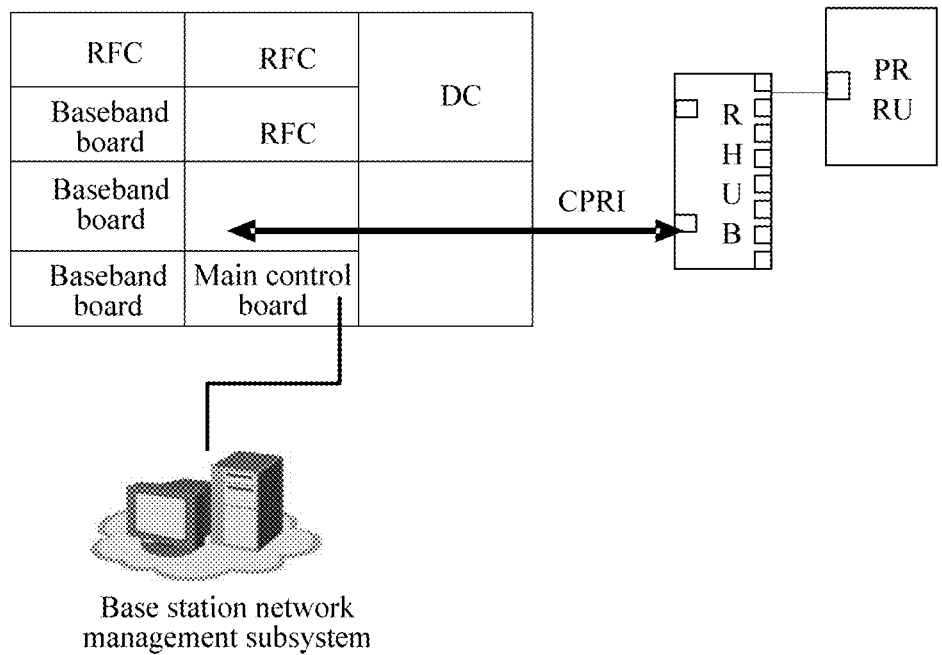
FIG. 11
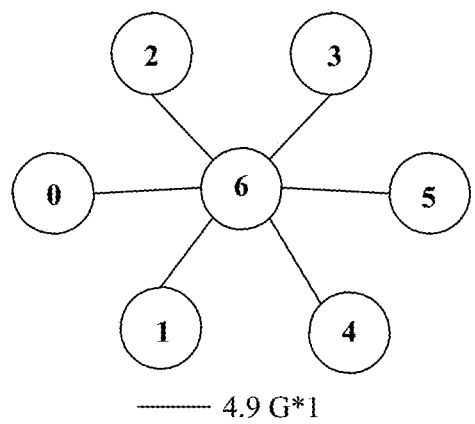
----- 4.9 G*1
FIG. 12-a

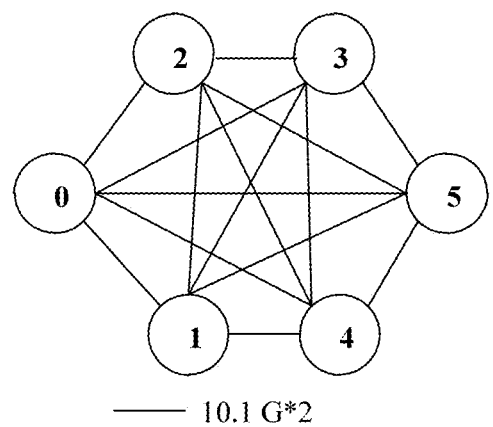
—— 10.1 G*2
FIG. 12-b
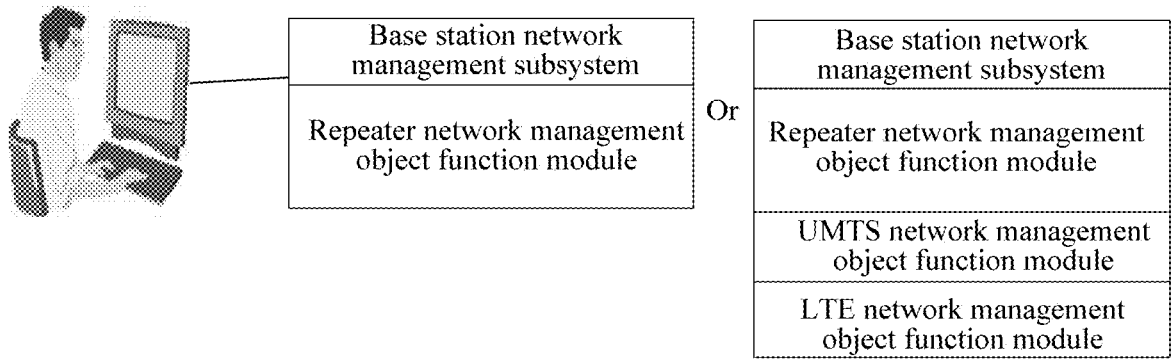
FIG. 13

INTEGRATED ACCESS SYSTEM WITH BASEBAND UNIT AND BASE STATION NETWORK MANAGEMENT

CROSS-REFERENCE TO RELATED APPLICATIONS

This application is a continuation of International Application No. PCT/CN2016/108047, filed on Nov. 30, 2016, the disclosure of which is hereby incorporated by reference in its entirety.

TECHNICAL FIELD

Embodiments of the present invention relate to the communications field, and in particular, to an integrated access system.

BACKGROUND

LampSite is an indoor coverage solution. LampSite is mainly dedicated to indoor coverage of mobile broadband data. Through digitalization of indoor coverage, indoor coverage construction and maintenance costs are greatly reduced, and mobile broadband experience is continuously enhanced.

With rapid development of the mobile communications market, a user increasingly expects to be provided with high-quality communication whenever and wherever possible. Therefore, a mobile communications service provider begins to dispose repeaters in coverage holes that radio waves can hardly cover, for example, outdoors, inside buildings, and underground, to furthest meet a requirement of the user for a call service. An integrated access system implemented based on LampSite is a dedicated distributed system architecture for supporting a plurality of standards and a plurality of frequency bands. Both a repeater network management subsystem and a base station network management subsystem exist in the integrated access system. A current integrated access system further includes other various product function modules such as a baseband unit (BBU), a remote common public radio interface (CPRI) data exchange unit (which is also referred to as an RHUB), a digital conversion unit (DCU), a remote radio unit (RRU), and a pico remote radio unit (pRRU). The DCU serves as a convergence node. The DCU is configured to support feeding of a radio frequency signal source of a third party. The DCU is a conversion unit for converting a radio frequency signal into in-phase/quadrature (I/Q) data. The DCU is connected to the BBU, the RRU, and the RHUB by using a CPRI channel. The DCU is connected to the repeater network management subsystem by using an operation management (OM) channel. The base station network management subsystem is connected to the BBU by using the OM channel. The RHUB is connected to the pRRU by using an electrical interface of the CPRI channel (which is also referred to as a CPRI-E). The BBU is configured to centrally control and manage an entire base station system. The RHUB implements communication between the BBU and the pRRU. The pRRU implements a radio frequency signal processing function.

In the current integrated access system, at least the following technical problems exist. With continuous improvement of a BBU cell capability and a CPRI capability, the DCU serving as a convergence node gradually becomes a bottleneck. The DCU needs to be connected to the repeater network management subsystem by using the OM channel, and the base station network management subsystem further needs to be connected to the BBU by using the OM channel. This results in a complex composition structure inside the integrated access system. In addition, the repeater network management subsystem and the base station network management subsystem are independent of each other. No maintenance link exists therebetween. The repeater network management subsystem and the base station network management subsystem cannot allocate carrier resources to a shared device simultaneously. Configuration consistency between the repeater network management subsystem and the base station network management subsystem needs to be manually ensured, resulting in low reliability and maintainability.

SUMMARY

Embodiments of the present invention provide an integrated access system, to simplify an internal networking structure of an existing integrated access system, reduce a quantity of configured independent network elements, and improved reliability and maintainability of the integrated access system.

According to a first aspect, an embodiment of the present invention provides an integrated access system. The integrated access system includes a first baseband unit BBU, a remote common public radio interface CPRI data exchange unit, a first radio frequency card (RFC) board, a repeater network management object function module, and a base station network management subsystem. The first RFC board is inserted on a socket of the first BBU, and the repeater network management object function module is disposed in the base station network management subsystem. The first BBU is connected to the remote CPRI data exchange unit by using a first CPRI channel, and the first BBU is connected to the base station network management subsystem by using an operation management (OM) channel. The first RFC board includes a digital up- and down-frequency conversion module, a digital combination and division module, and a CPRI compression and decompression module. The digital up- and down-frequency conversion module is connected to the digital combination and division module, and the digital combination and division module is connected to the CPRI compression and decompression module. The first BBU includes a CPRI mapping and demapping module, and the CPRI mapping and demapping module is connected to the CPRI compression and decompression module. In this embodiment of the present invention, a DCU does not need to be disposed in the integrated access system as a convergence unit. Instead, the first BBU is used as a convergence unit in the integrated access system. Both the remote CPRI data exchange unit and the base station network management subsystem are directly connected to the first BBU. In addition, the first RFC board is inserted on the socket of the first BBU, so that the first RFC board and the first BBU can coexist in a subrack. The RFC does not need to be separately configured. In the prior art, a function implemented by the DCU is completed by using the digital combination and division module and the CPRI compression and decompression module that are disposed on the first RFC board, so that a normal function of the entire system is not affected after the independent apparatus, namely, the DCU, is removed from the integrated access system. In addition, in this embodiment of the present invention, the repeater network management object function module is used as a separate function module in the base station network management subsystem, and the base station network management subsystem is connected to the first BBU by using the OM channel, thereby reducing a quantity of used OM channels, and reducing deployment costs of the system. The repeater network management object function module is a part of the base station network management subsystem. Therefore, the repeater network management object function module and the base station network management subsystem can be jointly maintained in the base station network management subsystem, carrier resources can be allocated to a shared device simultaneously, and reliability and maintainability of the integrated access system can be greatly improved.

With reference to the first aspect, in a first possible implementation of the first aspect, the first RFC board includes a plurality of RFC modules, each RFC module includes one digital up- and down-frequency conversion module, one digital combination and division module, and one CPRI compression and decompression module, and the CPRI compression and decompression module in the RFC module is connected to the CPRI mapping and demapping module.

With reference to the first aspect, in a second possible implementation of the first aspect, the CPRI mapping and demapping module is specifically a first interface board or a first baseband board in the first BBU. Therefore, the first interface board or the first baseband board in the first BBU can implement a CPRI mapping and demapping function.

With reference to the first aspect, in a third possible implementation of the first aspect, the first BBU further includes a main control board, and the main control board is connected to the base station network management subsystem by using the OM channel.

With reference to the first aspect, in a fourth possible implementation of the first aspect, the integrated access system further includes a second BBU and a second RFC board, the second RFC board is inserted on a socket of the second BBU, the first BBU is a master BBU, and the second BBU is a slave BBU, and the first BBU is connected to the second BBU by using a second CPRI channel.

With reference to the fourth possible implementation of the first aspect, in a fifth possible implementation of the first aspect, the integrated access system includes N second BBUs, where N is a natural number greater than or equal to 2, and the first BBU is connected to the N second BBUs by using N second CPRI channels, where the first BBU is connected to one second BBU by using one second CPRI channel. In this embodiment of the present invention, a CPRI topology management protocol is extended, to support a networking topology of one master BBU for a plurality of slave BBUs.

With reference to the fourth possible implementation of the first aspect, in a sixth possible implementation of the first aspect, the first BBU includes a first baseband board, and the second BBU includes a second interface board, the first baseband board is connected to the second interface board by using the second CPRI channel, and the first BBU and the second BBU complete exchange of in-phase/quadrature I/Q data, clock information CI, CPRI control words, and OM messages by using the second CPRI channel. In this embodiment of the present invention, a CPRI channel is extended by using a CPRI channel multiplexing technology, so that forwarding and convergence of inter-subrack related data, clock recovery, and exchange of CPRI control words and OM messages can be completed by using only a CPRI interconnection cable. In this embodiment of the present invention, based on the CPRI channel multiplexing technology, inter-subrack OM messages and clock information are exchanged by using a fast Ethernet channel.

With reference to the fourth possible implementation, the fifth possible implementation, or the sixth possible implementation of the first aspect, in a seventh possible implementation of the first aspect, the integrated access system further includes a remote radio unit RRU and a pico remote radio unit pRRU, the RRU is connected to the second BBU by using a third CPRI channel, and the pRRU is connected to the remote CPRI data exchange unit by using a fourth CPRI channel.

With reference to the first aspect, or the first possible implementation, the second possible implementation, the third possible implementation, the fourth possible implementation, the fifth possible implementation, the sixth possible implementation, or the seventh possible implementation of the first aspect, in an eighth possible implementation of the first aspect, the first BBU includes M slots, for the M slots, every two slots are interconnected by using a high-speed interconnection cable, and each slot can be configured to converge fibers for output, where M is a natural number greater than or equal to 2. In this embodiment of the present invention, through interconnection between every two slots, each slot can be configured to converge fibers for output, thereby improving efficiency of the fibers for output.

With reference to the first aspect, or the first possible implementation, the second possible implementation, the third possible implementation, the fourth possible implementation, the fifth possible implementation, the sixth possible implementation, the seventh possible implementation, or the eighth possible implementation of the first aspect, in a ninth possible implementation of the first aspect, in addition to the repeater network management object function module, the base station network management subsystem further includes network management object function modules in at least two different network standards. In this embodiment of the present invention, the network management subsystem includes network management object function modules in a plurality of network standards, thereby implementing network management of the integrated access system in the plurality of network standards.

BRIEF DESCRIPTION OF THE DRAWINGS

FIG. 11 is a schematic diagram of an implementation scenario of using one BBU in an integrated access system according to an embodiment of the present invention;

FIG. 12-a is a schematic diagram showing that a plurality of slots in a BBU are connected to a same slot in the prior art;

FIG. 12-b is a schematic diagram showing that a plurality of slots in a BBU are connected to each other by using high-speed interconnection cables according to an embodiment of the present invention;

FIG. 13 is a schematic diagram of a scenario in which during operation and maintenance, a client uses a same set of operation and maintenance interfaces according to an embodiment of the present invention.

DETAILED DESCRIPTION OF ILLUSTRATIVE EMBODIMENTS

Embodiments of the present invention provide an integrated access system, to simplify an internal networking structure of an existing integrated access system, reduce a quantity of configured independent network elements, and improved reliability and maintainability of the integrated access system.

The following describes the embodiments of the present invention with reference to accompanying drawings. In the specification, claims, and accompanying drawings of the present invention, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present invention. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, product, or device.

Figure 1:
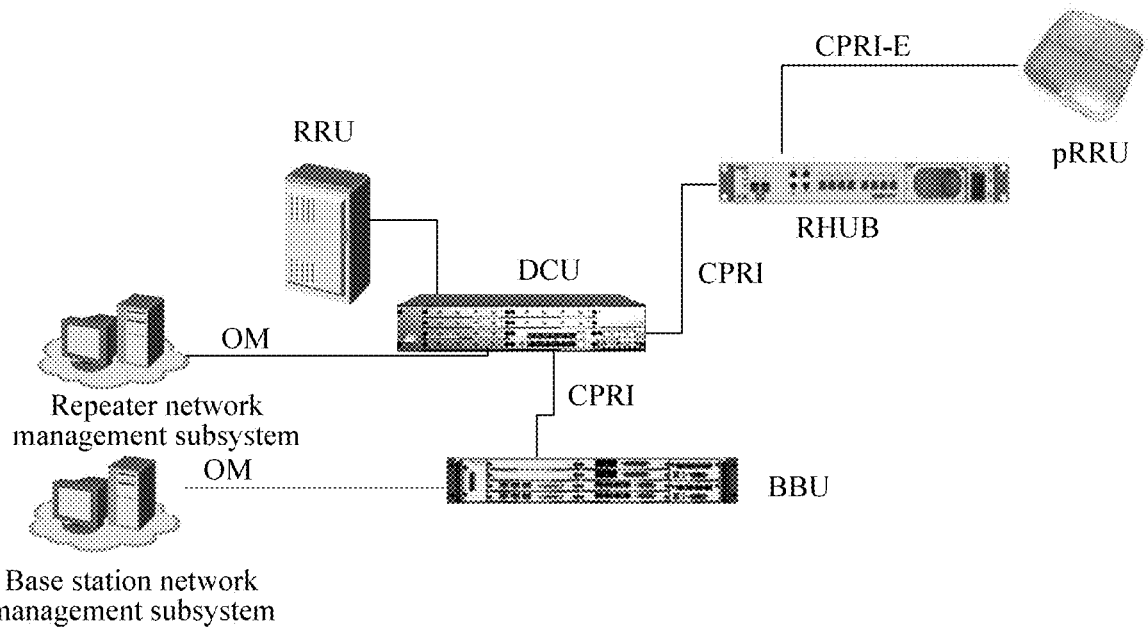
FIG. 1 is a schematic diagram of a networking architecture of LampSite in the prior art.
Figure 2:
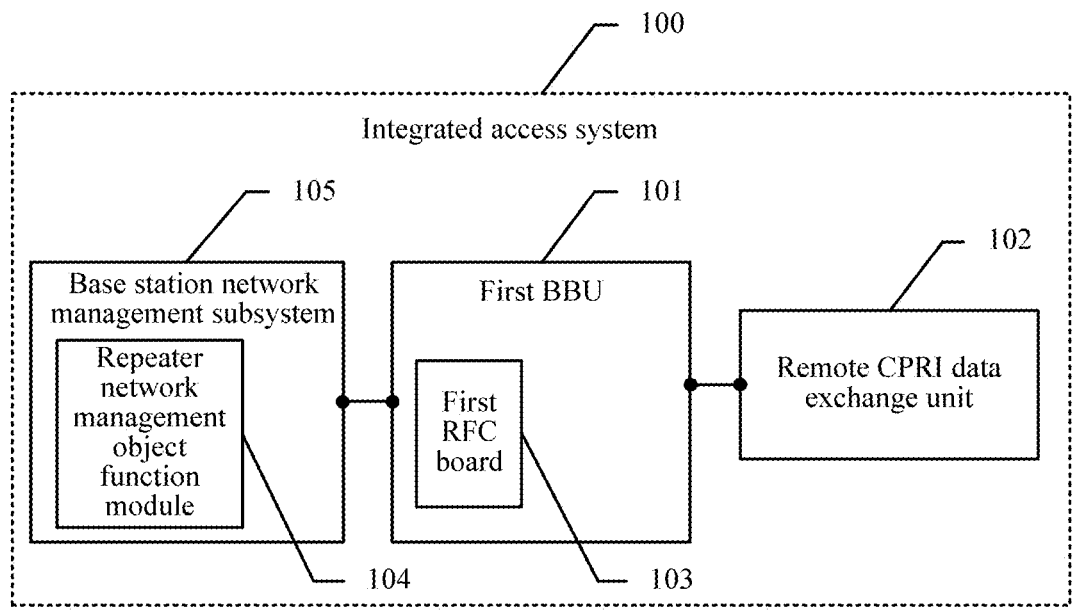
FIG. 2 is a schematic diagram of a composition structure of an integrated access system according to an embodiment of the present invention.

The integrated access system provided in the embodiments of the present invention is applicable to a scenario in which a single operator and a plurality of operators uniformly perform operation and maintenance, so that a repeater network management object function module and a base station network management subsystem are implemented by using an independent network element, thereby maintaining the repeater network management object function module and the base station network management subsystem by sharing a same Internet Protocol (IP) address and sharing a same operation and maintenance interface. In the prior art, a DCU is disposed in the integrated access system. The DCU includes an RFC module and a digital processing card (DPC). The DPC is configured to converge fibers for output and process in-phase/quadrature data. In the embodiments of the present invention, the DCU is removed from the integrated access system, an RFC board is disposed, the RFC board and a first BBU are designed to coexist in a subrack, and the RFC board is inserted on a socket of the first BBU. Referring to FIG. 2, an integrated access system 100 provided in an embodiment of the present invention may include a first BBU 101, a remote CPRI data exchange unit 102, a first radio frequency card (RFC) board 103, a repeater network management object function module 104, and a base station network management subsystem 105.

The first RFC board 103 is inserted on a socket of the first BBU 101, and the repeater network management object function module 104 is disposed in the base station network management subsystem 105.

The first BBU 101 is connected to the remote CPRI data exchange unit 102 by using a first CPRI channel, and the first BBU 101 is connected to the base station network management subsystem 105 by using an OM channel.

The first RFC board includes a digital up- and down-frequency conversion module, a digital combination and division module, and a CPRI compression and decompression module. The digital up- and down-frequency conversion module is connected to the digital combination and division module, and the digital combination and division module is connected to the CPRI compression and decompression module.

The first BBU includes a CPRI mapping and demapping module, and the CPRI mapping and demapping module is connected to the CPRI compression and decompression module.

In this embodiment of the present invention, the first RFC board includes the digital up- and down-frequency conversion module, the digital combination and division module, and the CPRI compression and decompression module. The digital up- and down-frequency conversion module is configured to perform up- and down-frequency conversion processing on in-phase/quadrature data. The digital combination and division module performs radio frequency combination and division processing on the in-phase/quadrature data. The CPRI compression and decompression module is configured to compress and decompress the in-phase/quadrature data according to a CPRI protocol. CPRI decompression is performed for a downlink data transmission process, and CPRI compression is performed for an uplink data transmission process. The RFC board provided in this embodiment of the present invention includes the digital combination and division module and the CPRI compression and decompression module. Therefore, based on the RFC board provided in this embodiment of the present invention, radio frequency combination and division processing can be completed on the in-phase/quadrature data, and compression and decompression are performed according to the CPRI protocol. In this embodiment of the present invention, a communication connection between the first RFC board and the first BBU may be completed by using the CPRI mapping and demapping module in the first BBU. That is, the CPRI mapping and demapping module is connected to the CPRI compression and decompression module. In this embodiment of the present invention, CPRI mapping and demapping are completed in the first BBU. CPRI mapping and demapping can be completed without disposing a DCU in the integrated access system. Therefore, the first RFC board and the first BBU are disposed in the integrated access system, so that the DCU is removable from the integrated access system, thereby reducing a quantity of independent network elements in the integrated access system, and optimizing a networking structure.

Figure 3:
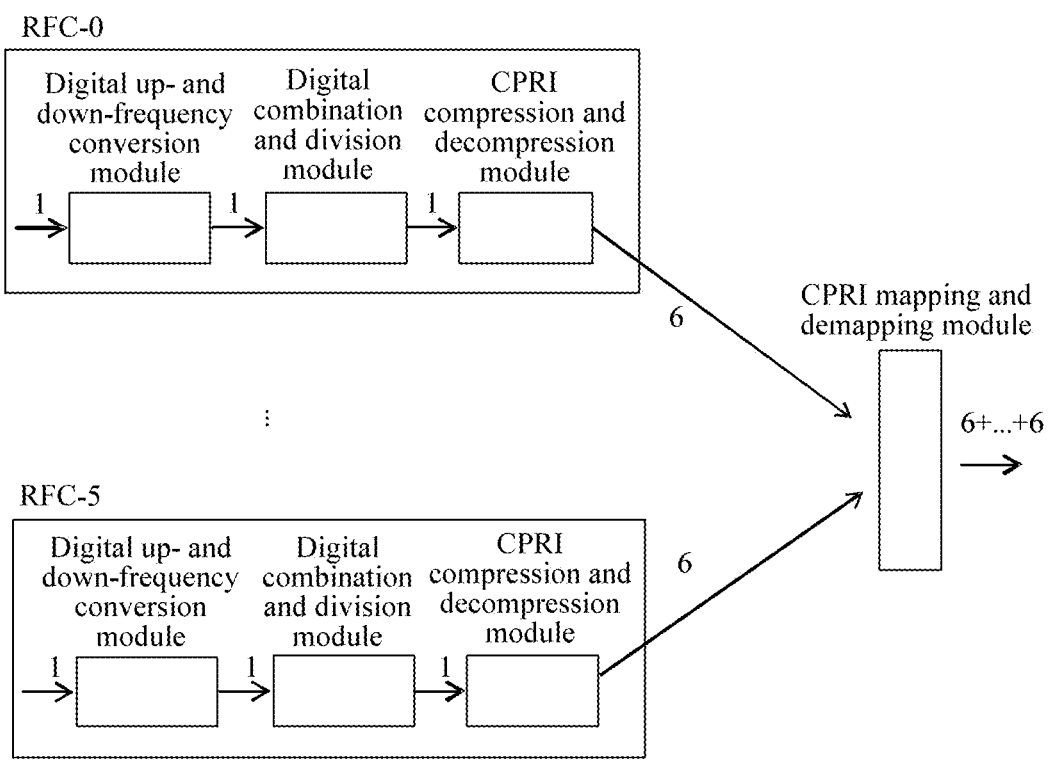
FIG. 3 is a schematic diagram of data transmission between a first RFC board and a first BBU according to an embodiment of the present invention.

In some embodiments of the present invention, the first RFC board includes a plurality of RFC modules, each RFC module includes one digital up- and down-frequency conversion module, one digital combination and division module, and one CPRI compression and decompression module, and the CPRI compression and decompression module in the RFC module is connected to the CPRI mapping and demapping module. Referring to FIG. 3, an example is used to describe data transmission between the first RFC board and the first BBU. An example in which the first RFC board includes six RFC modules is used. The six RFC modules are RFC-0, RFC-1, RFC-2, RFC3, RFC-4, and RFC-5. One digital up- and down-frequency conversion module, one digital combination and division module, and one CPRI compression and decompression module are disposed in each RFC module. In the embodiments of the present invention, a manner in which the first RFC board is connected to the first BBU supports flexible networking, so that the first RFC board and the first BBU can coexist in a subrack. In the prior art, the RFC module in the DCU completes only digital up- and down-frequency conversion, while the RFC board provided in this embodiment of the present invention implements distributed digital combination and division and a CPRI compression/decompression function. Distribution and replication of downlink data and a combination function of uplink data of six pieces of corresponding CPRI data are completed on the RFC board, and the RFC board can complete functions of CPRI compression and decompression and digital combination and division. The RFC board provided in this embodiment of the present invention replaces a function of the DCU in the prior art, so that the RFC board performs distributed digital combination and division and CPRI compression/decompression processing. Function complexity of an output fiber board is reduced by using a distributed processing technology. In this way, the function of the DCU in the prior art is implemented by a fusion architecture of the RFC board and the CPRI mapping and demapping module provided in this embodiment of the present invention, initial deployment costs of the integrated system are reduced, and the CPRI mapping and demapping module is supported in converging fibers for output.

In some embodiment of the present invention, the CPRI mapping and demapping module is specially a first interface board or a first baseband board in the first BBU. With reference to FIG. 3, the first interface board or the first baseband board in the first BBU may be connected to the CPRI compression and decompression module in the first RFC board. That is, the first interface board or the first baseband board in the first BBU can implement a CPRI mapping and demapping function.

In this embodiment of the present invention, a communication message and a frame format between the RFC board and the CPRI mapping and demapping module in a subrack need to use simple CPRI (sCPRI) frame mapping, a control word is an sCPRI message, and a quantity of pieces of I/Q data needs to be determined based on a quantity of optical ports of an output fiber board for convergence.

Figure 4:
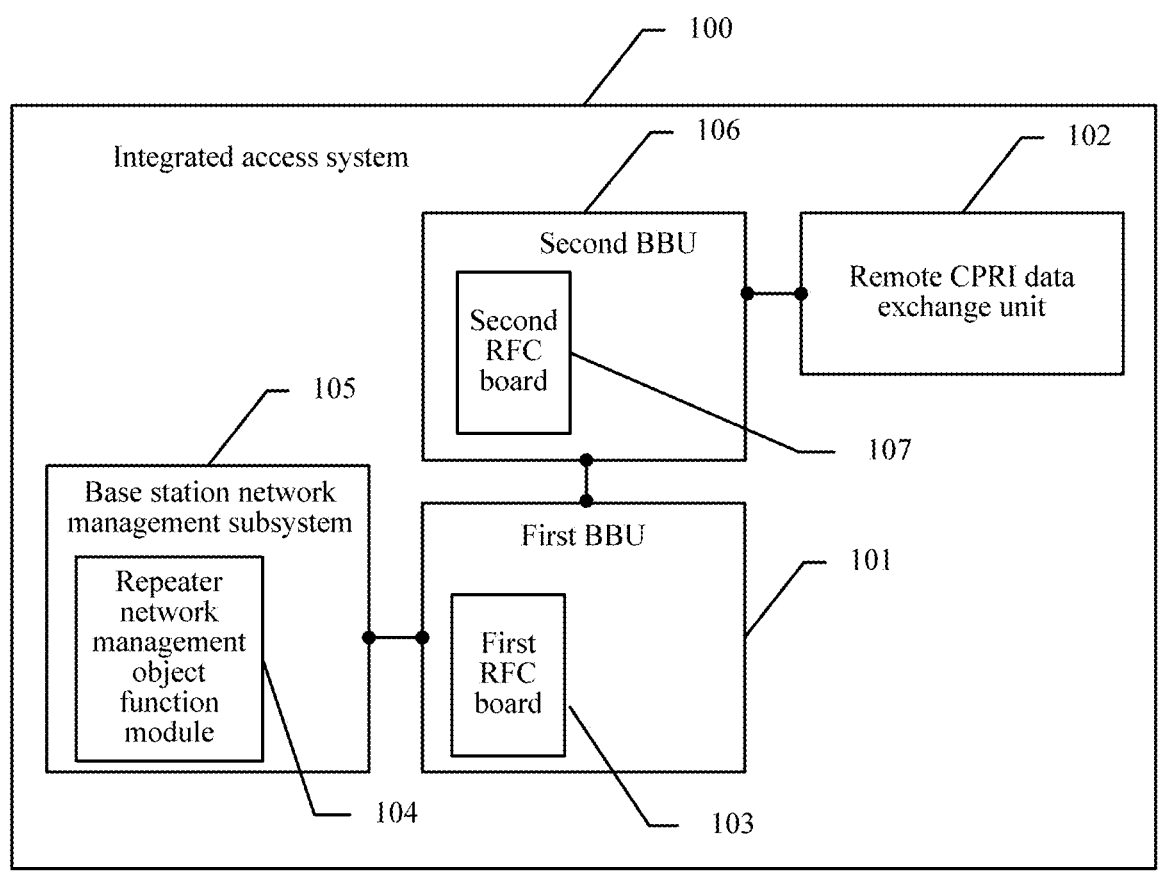
FIG. 4 is a schematic diagram of a composition structure of another integrated access system according to an embodiment of the present invention.

In some embodiments of the present invention, referring to FIG. 4, the integrated access system 100 further includes a second BBU 106 and a second RFC board 107. The second RFC board 107 is inserted on a socket of the second BBU 106. The first BBU is a master BBU, and the second BBU is a slave BBU. The first BBU is connected to the second BBU by using a second CPRI channel. A manner in which the second BBU is connected to the second RFC board is similar to the manner in which the first BBU is connected to the first RFC board, and refer to the descriptions of the foregoing embodiments. When a plurality of BBUs are disposed in the integrated access system. One of the plurality of BBUs is used as a master BBU, and remaining BBUs are used as slave BBUs. The master BBU is connected to the slave BBUs by using the second CPRI channel. In a scenario shown in FIG. 4, the remote CPRI data exchange unit is directly connected to the second BBU, and the second BBU is connected to the first BBU by using the second CPRI channel.

Figure 5:
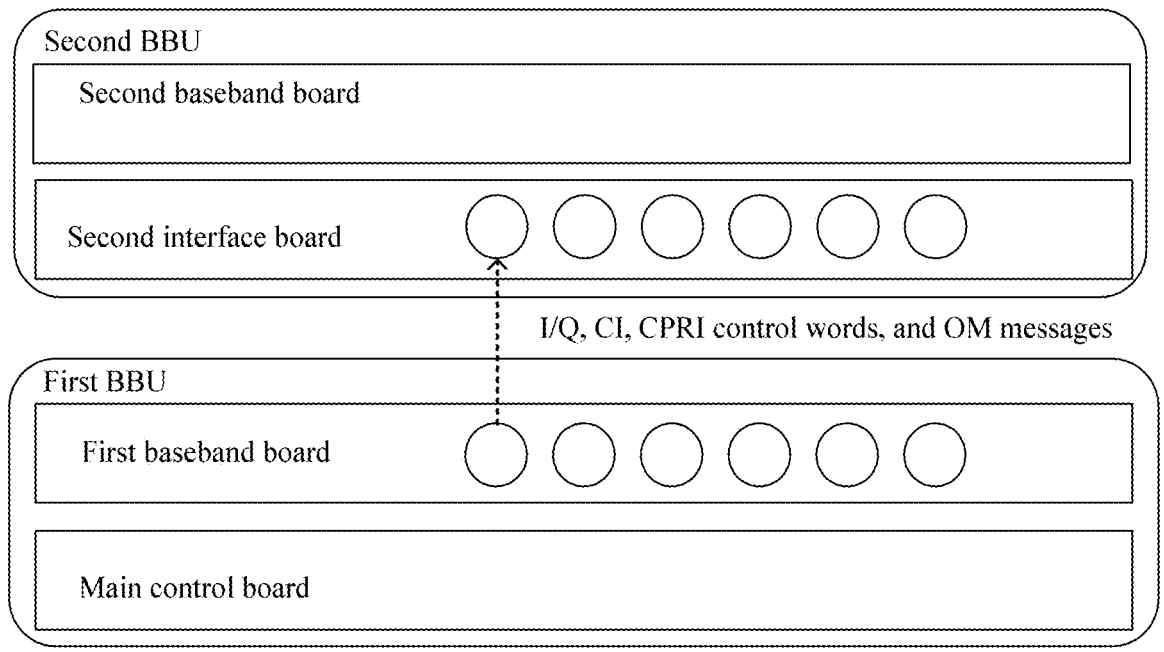
FIG. 5 is a schematic diagram of data transmission between a first BBU and a second BBU according to an embodiment of the present invention.

In some embodiments of the present invention, the first BBU includes a first baseband board, and the second BBU includes a second interface board. The first baseband board is connected to the second interface board by using the second CPRI channel. The first BBU and the second BBU complete exchange of in-phase/quadrature I/Q data, clock information (CI), CPRI control words, and OM messages by using the second CPRI channel. Referring to FIG. 5, the first baseband board and a main control board are disposed on the first BBU, and the second interface board and a second baseband board are disposed on the second BBU. The first baseband board is connected to the second interface board by using the second CPRI channel.

In the prior art, two types of cables are required for inter-subrack interconnection between two BBUs an I/Q interconnection cable for inter-subrack forwarding of CPRI I/Q data, convergence, and clock recovery, and a CI interconnection cable for exchange of CPRI control words, OM messages, and clock information (which is also referred to as clock synchronization information). The clock information is time information in a CPRI control word. In this embodiment of the present invention, a CPRI channel is extended by using a CPRI channel multiplexing technology, so that forwarding and convergence of inter-subrack related data, clock recovery, and exchange of CPRI control words and OM messages can be completed by using only a CPRI interconnection cable. In this embodiment of the present invention, based on the CPRI channel multiplexing technology, inter-subrack OM messages and clock information are exchanged through a fast Ethernet channel.

Figure 6:
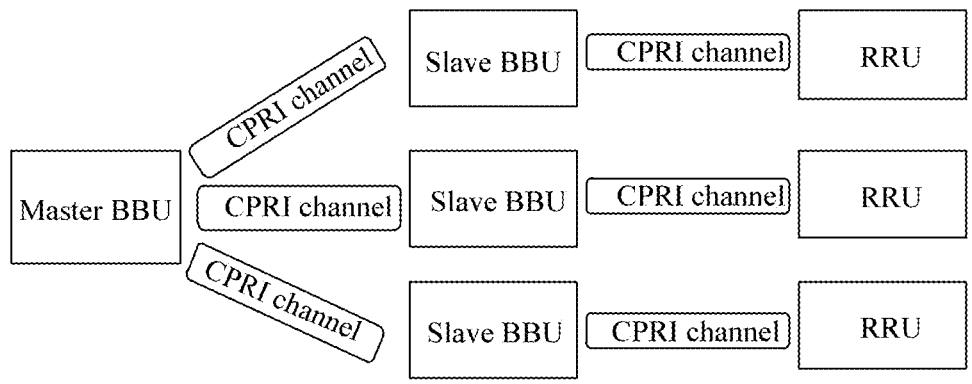
FIG. 6 is a schematic diagram of interconnection between a first BBU and a plurality of second BBUs according to an embodiment of the present invention.
Figure 7:
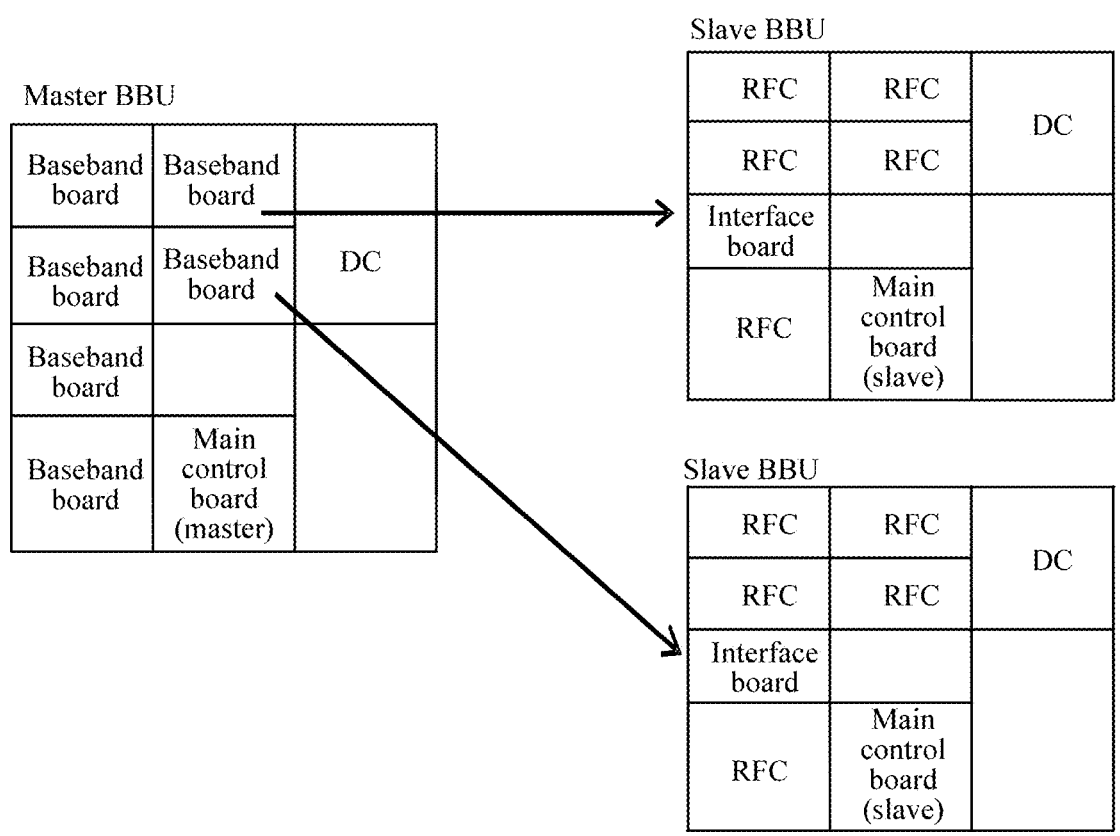
FIG. 7 is a schematic diagram showing that a first BBU is connected to a plurality of second BBUs by using baseband boards and interface boards according to an embodiment of the present invention.

In some embodiments of the present invention, the first BBU may be connected to the second BBU by using only the second CPRI channel. For inter-subrack communication optimization for the master BBU and the slave BBUs, a networking topology of the master BBU and the plurality of slave BBUs is supported. Further, in some embodiments of the present invention, the integrated access system includes N second BBUs, where N is a natural number greater than or equal to 2. The first BBU is connected to the N second BBUs by using N second CPRI channels, where the first BBU is connected to one second BBU by using one second CPRI channel. Referring to FIG. 6, one master BBU is connected to a plurality of slave BBUs by using CPRI channels, and each slave BBU is connected to an RRU by using a CPRI channel. In the prior art, communication between only one BBU and one BBU can be supported. In the embodiments of the present invention, a CPRI topology management protocol is extended, to support a networking topology of one master BBU for a plurality of slave BBUs. An example is used for description below. Referring to FIG. 7, an example in which one master BBU is connected to two slave BBUs by using CPRI channels is used. A plurality of baseband boards, a main control board (master), and a direct current (DC) power are disposed in the master BBU. A plurality of RFC boards, a main control board (slave), an interface board, and a direct current power are disposed and inserted in the slave BBU. The master BBU is connected to an interface board of one slave BBU by using one baseband board, and the master BBU is connected to an interface board of the other slave BBU by using another baseband board.

Figure 8:
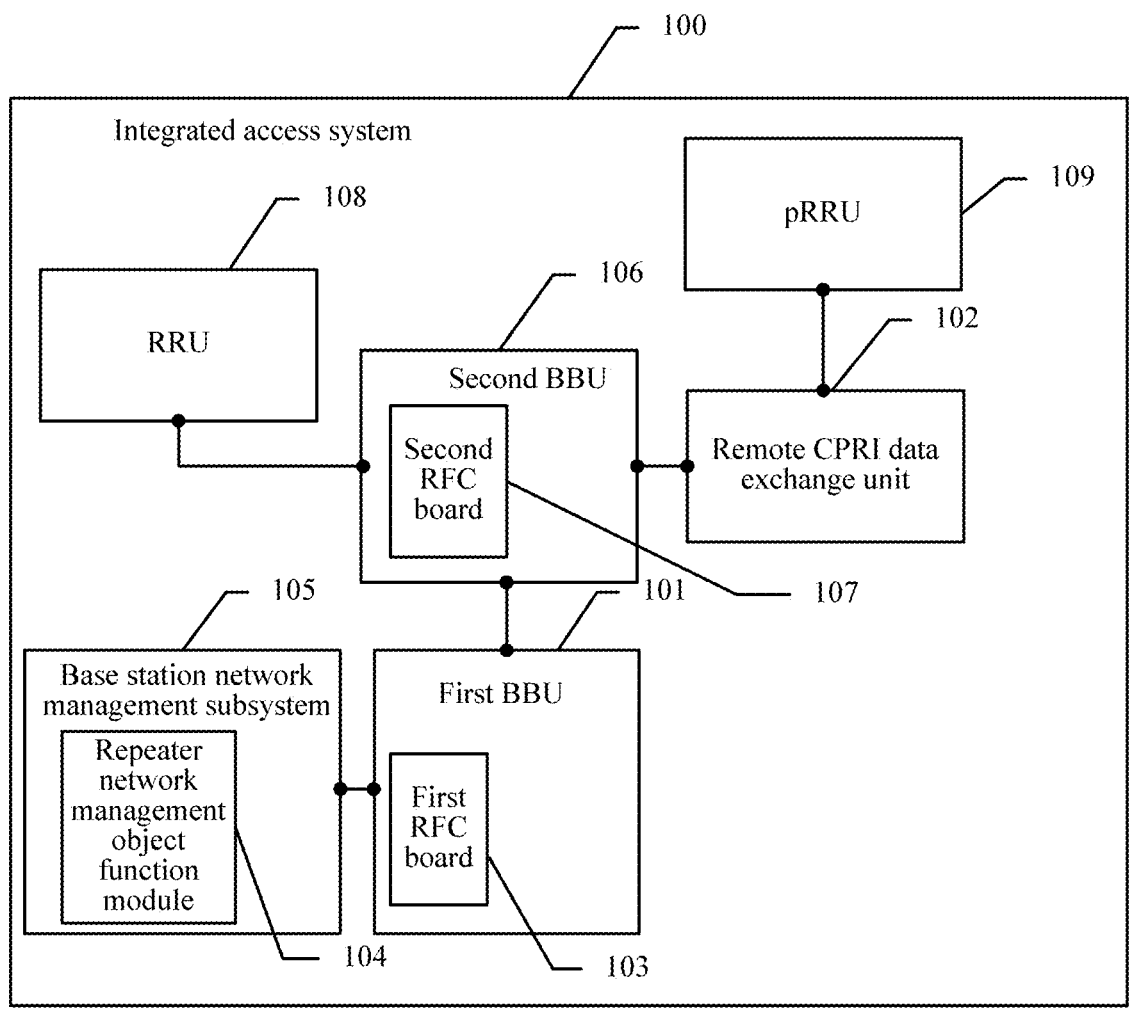
FIG. 8 is a schematic diagram of a composition structure of another integrated access system according to an embodiment of the present invention.

Further, in some embodiments of the present invention, referring to FIG. 8, the integrated access system 100 further includes an RRU 108 and a pRRU 109. The RRU 108 is connected to the second BBU 106 by using a third CPRI channel, and the pRRU 109 is connected to the remote CPRI data exchange unit 102 by using a fourth CPRI channel.

Figure 9:
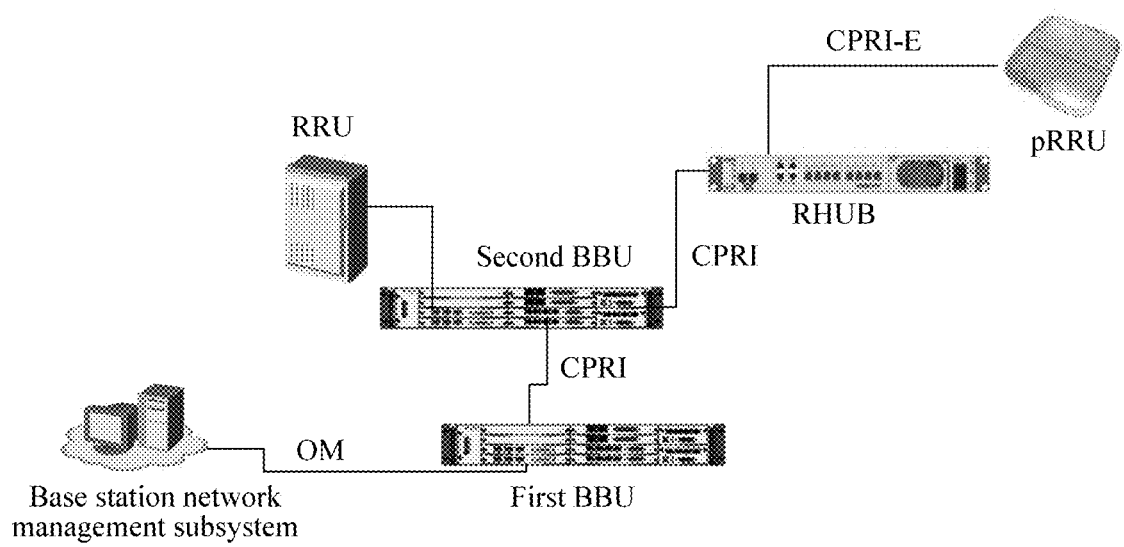
FIG. 9 is a schematic diagram of system architecture deployment of an integrated access system according to an embodiment of the present invention.

In some other embodiments of the present invention, FIG. 9 is a schematic diagram of system architecture deployment of an integrated access system according to an embodiment of the present invention. An example in which one master BBU and one slave BBU are disposed in the integrated access system is used. A first BBU is connected to a second BBU by using a CPRI channel. The second BBU is connected to an RRU and an RHUB. The RHUB is connected to a pRRU by using a CPRI-E interface. The first BBU is connected to a base station network management subsystem by using an OM channel. A first RFC board is inserted on a socket of the first BBU. A repeater network management object function module is disposed in the base station network management subsystem.

Figure 10:
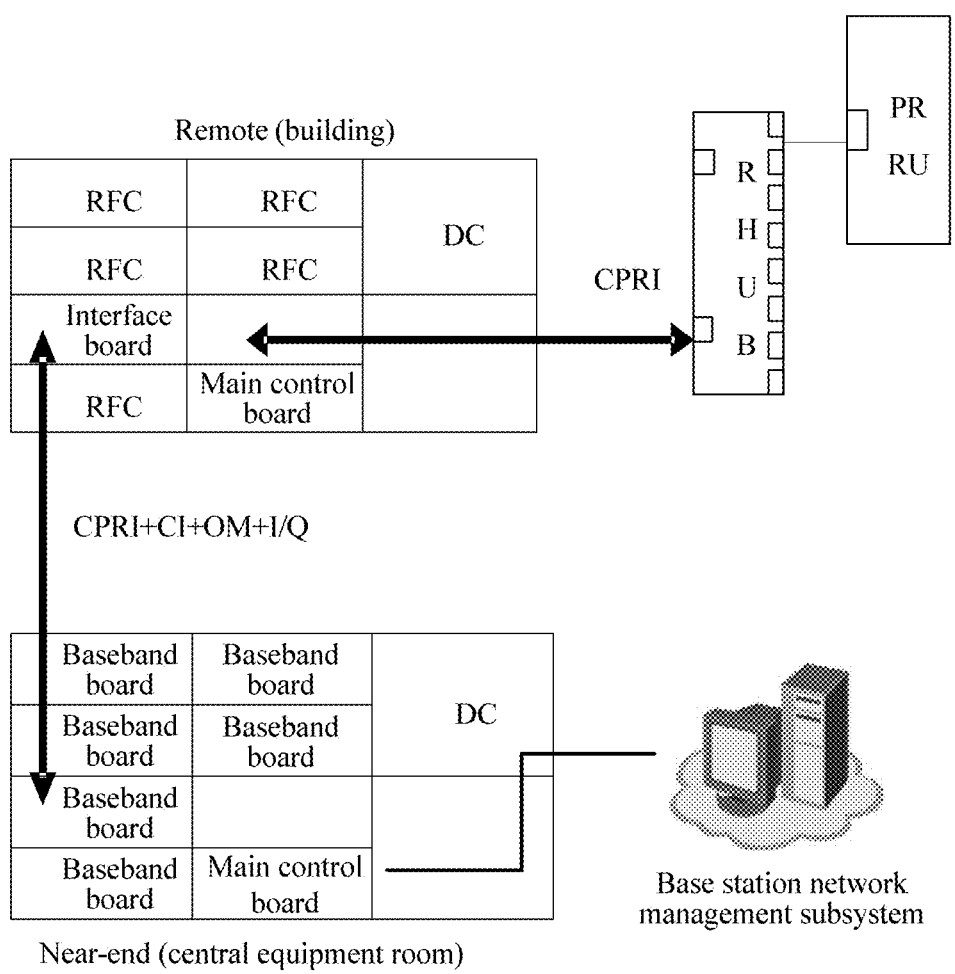
FIG. 10 is a schematic diagram of an implementation scenario of using a master BBU and a slave BBU in an integrated system according to an embodiment of the present invention.

In some embodiments of the present invention, FIG. 10 is a schematic diagram of an implementation scenario of using a master BBU and a slave BBU in the integrated system according to an embodiment of the present invention. A near-end BBU close to a central equipment room is the master BBU, and the master BBU is connected to the slave BBU by using a CPRI channel. The slave BBU is remotely disposed. For example, the slave BBU is disposed in a building. The slave BBU is connected to an RHUB by using a CPRI channel. One master BBU is connected to a plurality of slave BBUs, to support coverage of unified devices of a core equipment room to the periphery.

In some embodiments of the present invention, the first BBU further includes a main control board. The main control board is connected to the base station network management subsystem by using the OM channel. FIG. 11 is a schematic diagram of an implementation scenario of using one BBU in the integrated access system according to an embodiment of the present invention. The repeater network management object function module is disposed in the base station network management subsystem. The base station network management subsystem is connected to the main control board of the first BBU. The baseband board in the first BBU is connected to the RHUB.

In some embodiments of the present invention, the first BBU includes M slots. For the M slots, every two slots are interconnected by using a high-speed interconnection cable. Each slot can be configured to converge fibers for output, where M is a natural number greater than or equal to 2. Each slot can be configured to converge fibers for output, thereby improving efficiency of the fibers for output. An example is used for description below. FIG. 12-a is a schematic diagram showing that a plurality of slots in a BBU are connected to a same slot in the prior art. FIG. 12-b is a schematic diagram showing that a plurality of slots in a BBU are connected to each other by using high-speed interconnection cables according to an embodiment of the present invention. An example in which a quantity of slots disposed in the BBU is 7 is used. The slots are a slot 0, a slot 1, a slot 2, a slot 3, a slot 4, a slot 5, and a slot 6. In the prior art, the slot 0, the slot 1, the slot 2, the slot 3, the slot 4, and the slot 5 are all connected to the slot 6. Only a slot (namely, the slot 6) of the main control board is supported in converging fibers for output. A maximum inter-backplane capability is 4.9 G, and a convergence board can converge a maximum of 10 fibers for output. In this embodiment of the present invention, an RFC board card supports full switching of a backplane. Generally, the backplane supports full switching of 10.1 G*2. A high-speed interconnection cable is connected between every two slots of the slot 0, the slot 1, the slot 2, the slot 3, the slot 4, and the slot 5. The slot 0, the slot 1, the slot 2, the slot 3, the slot 4, and the slot 5 are all connected to the slot 6. Therefore, a full plane can be supported in converging fibers for output. A quantity of fibers for output can reach 36. In addition, an interface board and a baseband board are supported in converging fibers for output.

Figure 14:
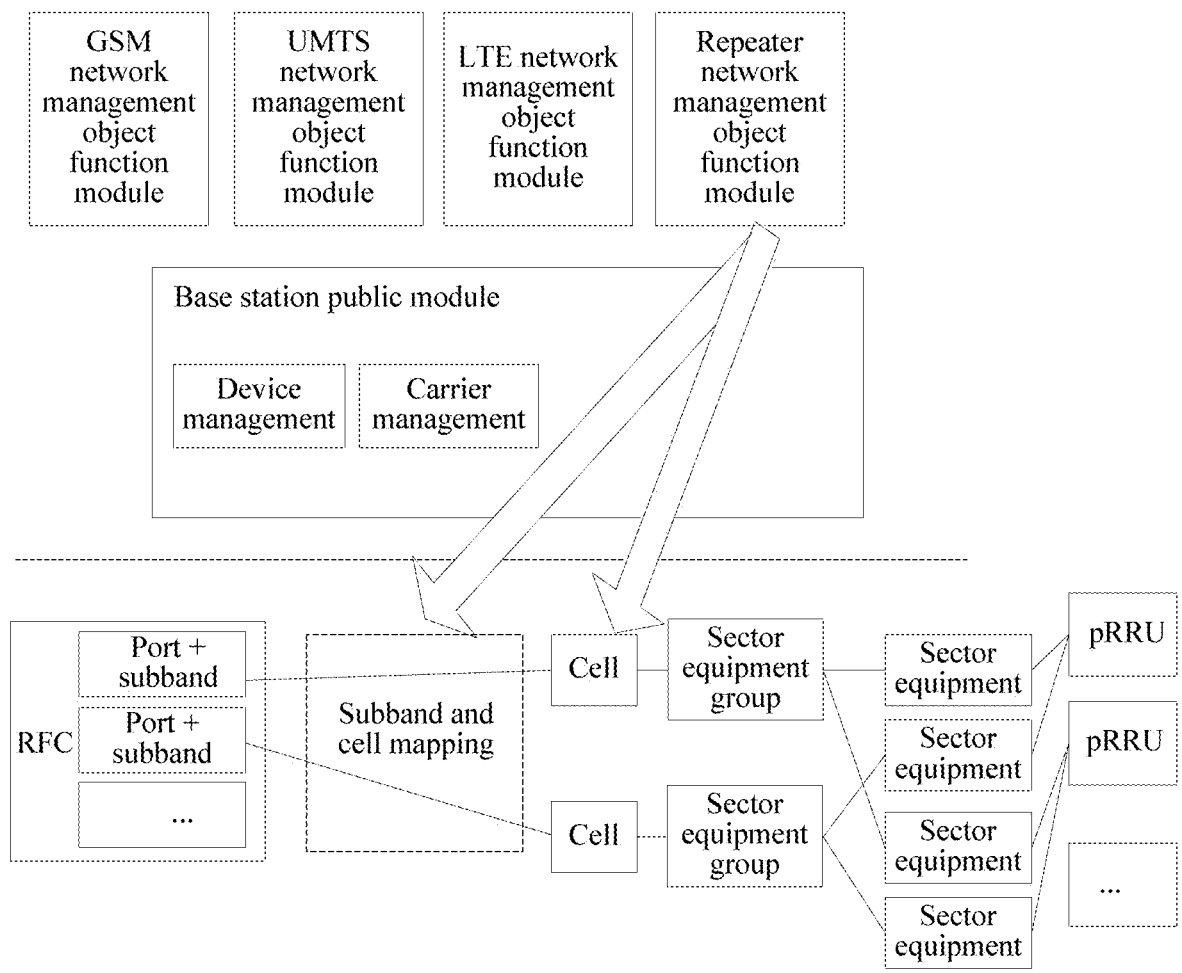
FIG. 14 is a schematic diagram of an implementation scenario in which a repeater network management object function module is applied to a base station network management subsystem according to an embodiment of the present invention.

In some embodiments of the present invention, in addition to the repeater network management object function module, the base station network management subsystem further includes network management object function modules in at least two different network standards. An example is used for description below. Referring to FIG. 13, the base station network management subsystem includes a repeater network management object function module, or the base station network management subsystem includes a repeater network management object function module, a Universal Mobile Telecommunications System (UMTS) network management object function module, and a Long Term Evolution (LTE) network management object function module, thereby supporting unified operation and maintenance of the BBU and a repeater. In this embodiment of the present invention, the base station network management subsystem is used as an independent network element, and uses an independent IP address. For the unified operation and maintenance of the BBU and the repeater, a same set of operation and maintenance interfaces is used. As shown in FIG. 14, an example is used for description below. The repeater network management subsystem is degenerated to a network management object function module in the base station network management subsystem. For the unified operation and maintenance of the BBU and the repeater, a set of operation and maintenance interfaces is used. Operation and maintenance experience of a client is uniform, thereby reducing operation and maintenance costs and manpower. In FIG. 14, a logical architecture of the base station network management subsystem may be divided into a Global System for Mobile Communications (GSM) network management object function module, a UMTS network management object function module, an LTE network management object function module, a repeater network management object function module, and a base station public module. The base station public module implements device management and carrier management. The repeater network management object function module in the base station network management subsystem implements communication between an RFC board and a cell through subband and cell mapping. The repeater network management object function module transmits data to a corresponding pRRU by using a sector equipment group and a corresponding sector equipment.

In the embodiments of the present invention, it can be learned from the descriptions of the plurality of examples that, in the integrated access system provided in the embodiments of the present invention, the RFC board and the BBU can coexist in a same subrack, the BBU and the RFC board can coexist in a same subrack and share a power supply, and backplane transmission between the BBU and the RFC board can be supported. Convergence of fibers for output is completed by using a baseband board in a scenario in which the RFC board and the BBU coexist in a same subrack. Completion of distributed digital combination and division and CPRI compression/decompression functions by using the RFC board is supported. Inter-subrack CPRI interconnection is supported, transmission of an OM message and a CPRI on a same channel is supported, and remote transmission by using a fiber is supported. A high-speed interconnection channel of the RFC board is supported, to complete I/Q forwarding and convergence. The base station network management subsystem and the repeater network management object function module are implemented by using an independent network element. Only one base station network management subsystem network element, one operation and maintenance node, and a transmission resource need to be managed. A co-MPT configuration is supported. Operation and maintenance experience keeps uniform. Public resource and fault management is uniformly completed by using one MPT.

It can be learned from the example descriptions of the foregoing embodiments for the present invention that, an integrated access system includes a first BBU, a remote CPRI data exchange unit, a first RFC board, a repeater network management object function module, and a base station network management subsystem. The first RFC board is inserted on a socket of the first BBU, and the repeater network management object function module is disposed in the base station network management subsystem. The first BBU is connected to the remote CPRI data exchange unit by using a first CPRI channel, and the first BBU is connected to the base station network management subsystem by using an OM channel. The first RFC board includes a digital up- and down-frequency conversion module, a digital combination and division module, and a CPRI compression and decompression module. The digital up- and down-frequency conversion module is connected to the digital combination and division module, and the digital combination and division module is connected to the CPRI compression and decompression module. The first BBU includes a CPRI mapping and demapping module, and the CPRI mapping and demapping module is connected to the CPRI compression and decompression module. In the embodiments of the present invention, a DCU does not need to be disposed in the integrated access system as a convergence unit. Instead, the first BBU is used as a convergence unit in the integrated access system. Both the remote CPRI data exchange unit and the base station network management subsystem are directly connected to the first BBU. In addition, the first RFC board is inserted on the socket of the first BBU, so that the first RFC board and the first BBU can coexist in a subrack. The RFC does not need to be separately configured. In the prior art, a function implemented by the DCU is completed by using the digital combination and division module and the CPRI compression and decompression module that are disposed on the first RFC board, so that a normal function of the entire system is not affected after the independent apparatus, namely, the DCU, is removed from the integrated access system. In addition, in the embodiments of the present invention, the repeater network management object function module is used as a separate function module in the base station network management subsystem, and the base station network management subsystem is connected to the first BBU by using the OM channel, thereby reducing a quantity of used OM channels, and reducing deployment costs of the system. The repeater network management object function module is a part of the base station network management subsystem. Therefore, the repeater network management object function module and the base station network management subsystem can be jointly maintained in the base station network management subsystem, carrier resources can be allocated to a shared device simultaneously, and reliability and maintainability of the integrated access system can be greatly improved.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the systems embodiments provided by the present invention, connection relationships between apparatuses indicate that the apparatuses have communication connections with each other, which may be specifically implemented as one or more communications buses or signal cables.

Based on the description of the foregoing implementations, a person skilled in the art may clearly understand that the present invention may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, or a dedicated circuit.

What is claimed is:
1. A system, comprising:
a first baseband unit (BBU) comprising a common public radio interface (CPRI) mapping and demapping module;
a remote CPRI data exchange unit, wherein the first BBU is connected to the remote CPRI data exchange unit through a first CPRI channel; and
a first radio frequency card (RFC) board inserted on a socket of the first BBU, wherein the first RFC board comprises:
a digital up and down frequency conversion module;
a digital combination and division module connected to the digital up and down frequency conversion module; and
a CPRI compression and decompression module connected to the digital combination and division module and connected through the socket to the CPRI mapping and demapping module;
a repeater network management object function module; and
a base station network management subsystem, wherein the repeater network management object function mod- ule is disposed in the base station network management subsystem, and wherein the first BBU is connected to the base station network management subsystem through an operation management (OM) channel.

2. The system according to claim 1, wherein the first RFC board comprises a plurality of RFC modules, wherein each of the plurality of RFC modules comprises a digital up- and down-frequency conversion module, a digital combination and division module, and a CPRI compression and decompression module, and wherein each respective CPRI compression and decompression module in a respective one of the plurality of RFC modules is connected to a respective CPRI mapping and demapping module.

3. The system according to claim 1, wherein the CPRI mapping and demapping module is a first interface board or a first baseband board in the first BBU.

4. The system according to claim 1, wherein the first BBU further comprises a main control board, and wherein the main control board is connected to the base station network management subsystem through the OM channel.

5. The system according to claim 1, further comprising:
a second BBU; and
a second RFC board inserted on a socket of the second BBU, wherein the first BBU is a master BBU, wherein the second BBU is a slave BBU, and wherein the first BBU is connected to the second BBU through a second CPRI channel.

6. The system according to claim 5, further comprising:
two or more second BBUs, wherein the first BBU is connected to the two or more second BBUs through two or more second CPRI channels, and wherein the first BBU is connected to each of the two or more second BBUs through one of the two or more second CPRI channels.

7. The system according to claim 5, wherein:
the first BBU comprises a first baseband board, and the second BBU comprises a second interface board;
the first baseband board is connected to the second interface board through the second CPRI channel; and
the first BBU and the second BBU exchange in-phase/quadrature (I/Q) data, clock information (CI), CPRI control words, and OM messages through the second CPRI channel.

8. The system according to claim 5, further comprising a remote radio unit (RRU) and a pico remote radio unit (pRRU), wherein the RRU is connected to the second BBU through a third CPRI channel, and wherein the pRRU is connected to the remote CPRI data exchange unit through a fourth CPRI channel.

9. The system according to claim 1, wherein the first BBU comprises two or more slots, wherein every two slots of the two or more slots are interconnected through a high-speed interconnection cable, and wherein each slot of the two or more slots is configured to converge fibers for data output.

10. The system according to claim 1, wherein the base station network management subsystem further comprises network management object function modules in at least two different network standards.

* * * * *